Sept. 23, 1924.
G. W. HARDY
1,509,552
EMERGENCY SLIDE
Filed Aug. 16, 1922
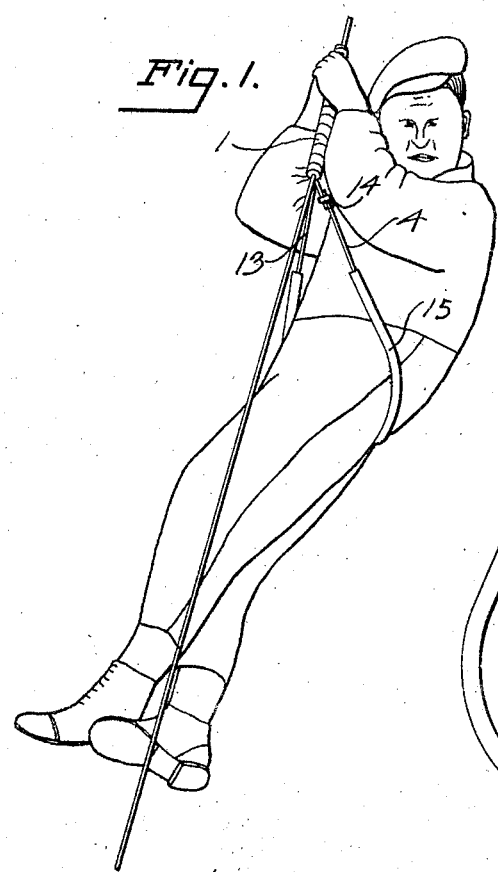
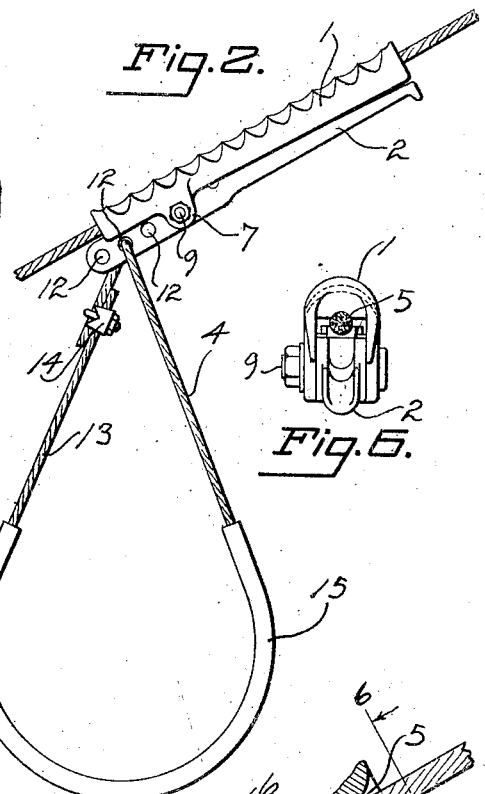
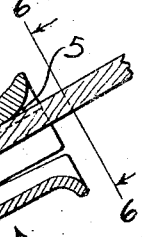
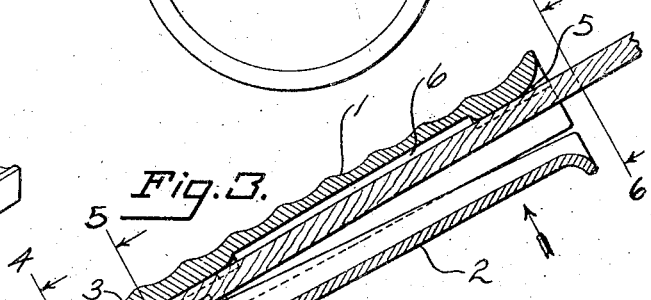
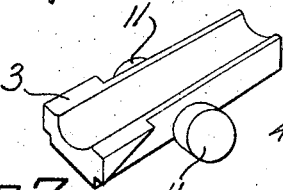
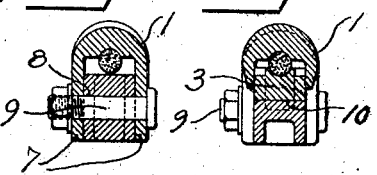
Inventor
GEORGE W. HARDY
Lyon & Lyon
Attorneys Patented Sept. 23, 1924.

1,509,552

UNITED STATES PATENT OFFICE.

GEORGE W. HARDY, OF LOS ANGELES, CALIFORNIA.

EMERGENCY SLIDE.

Application filed August 16, 1922. Serial No. 582,280.

*To all whom it may concern:*

Be it known that I, GEORGE W. HARDY, a citizen of the United States, residing at Los Angeles, in the county of Los Angeles and State of California, have invented a new and useful Emergency Slide, of which the following is a specification.

This invention provides an emergency safety device for leaving the elevated portions of oil derricks, such as the platforms known as "finger-board" and "Kelley-board." It provides a quick and safe means for escaping from these platforms in case the workman's position becomes unsafe for any reason such as fire or gas blow-out. The emergency slide is constructed to operate on the guy wires leading from the derricks.

An object of this invention is to provide a quick and safe means for sliding down a guy wire.

Another object of this invention is to provide such a device with a braking means positioned to control the downward sliding speed or completely check the slide as desired and to provide such braking means that may be controlled by the grip of the operator's hands.

A further object of this invention is to provide an emergency slide in which the weight of the operator assists in braking the sliding speed.

A further object of this invention is to provide an emergency slide in which the weight of the operator may be variably applied to assist in braking the sliding speed.

A further object of this invention is to provide an emergency slide in which the braking surface may be alined with a guy wire in all relative positions.

Other objects of this invention will appear from the following description and accompanying drawings illustrating the preferred embodiment of my invention:

Figure 1 illustrates the invention in use showing an operator traveling down a guy wire.

Fig. 2 illustrates the position of the slide on the guy wire.

Fig. 3 is a vertical section of the slide shown in Figure 2 with the weight supporting means broken away.

Fig. 4 is a section of the slide taken through 4—4, Fig. 3.

Fig. 5 is a section of the slide taken through 5—5, Fig. 3.

Fig. 6 is an end view of the slide looking from the line 6—6, Fig. 3 sectioning the guy wire.

Fig. 7 is an enlarged view of the brake shoe employed in this embodiment.

Referring to the drawings 1 generally indicates a member adapted to slide on the guy wire, 2 indicates a lever, 3 indicates a brake shoe and 4 generally indicates a supporting means for holding the operator's weight. The member 1 is notched to provide the proper grip for the operator's hand and contains a longitudinal groove 5 which rests on the upper side of the guy wire. The longitudinal groove is preferably broken by a recess 6 for decreasing friction on the guy wire. The member 1 contains extending portions 7 providing circular openings 8 for supporting a pin or bolt 9 which in turn supports the lever 2. The lever 2 is thus pivotally supported by the member 1, the bolt 9 providing the lever with a fulcrum. The lever 2 is recessed to partially accommodate the brake shoe 3 and is provided with circular sockets 10 into which trunnions 11 of the brake shoe are inserted. The brake shoe is thus pivotally supported by the lever 2 which permits the braking surface to be alined with the guy wire.

The lever 2 contains a projection beyond the fulcrum from the brake shoe which projection contains a plurality of openings 12 to which the supporting means 4 may be secured. The supporting means 4 preferably consists of a sling 13 formed of a guy wire fastened through one of the openings 12 on the projection of the lever 2, the ends of the sling 13 being connected by a suitable wire line clip 14. For the comfort of the operator the supporting means 4 may include a common pipe loop 15 which is slipped over the sling 13 as indicated in Figure 2.

In use the device is placed on the guy wire of the derrick and held in position near the platform. In case of emergency the workman escapes by inserting one leg through the supporting means 4, gripping the upper notched ends of the member 1 and the lever 2 with one or both hands and by the pressure on the lever 2 controls the braking or downward speed of the emergency slide. It will be seen that the supporting means 4 being suspended on the projection of the lever 2 beyond the fulcrum from the braking shoe, will assist the operator in applying the braking power to the emergency slide. A number of openings 12 are provided for so securing the supporting means 4, the particular opening through which the supporting means is secured, being determined by the slope of the guy wire. In general the steeper the wire on which the slide is intended to ride, the further from the fulcrum the supporting means should be positioned.

It is understood that my invention is not limited to the specific embodiment herein described but is of the scope set forth in the following claims.

I claim:

1. An emergency slide adapted for use on an inclined guy wire, comprising a member grooved to slidingly engage said wire, a lever pivotally secured to said member, a braking shoe pivotally mounted on one arm of said lever, said arm extending adjacent the grooved member with the braking shoe positioned to be brought into engagement with said guy wire, the second arm of said lever providing a plurality of attachment positions for a supporting member whereby the weight of an operator may be variably applied to actuate said braking shoe, said first-named arm and sliding member being shaped to permit the lever and grooved member to be simultaneously gripped and forced together by the operator to control the sliding speed.

2. An emergency slide adapted for use on an inclined guy wire, comprising a member grooved to slidingly engage said wire, a lever pivotally secured to said member, a braking shoe pivotally mounted on one arm of said lever, said arm extending adjacent the grooved member with the braking shoe positioned to be brought into engagement with said guy wire, the second arm of said lever providing an attachment position for a supporting member, such attachment position being in such position that the weight of an operator may be applied to actuate said braking shoe, said first-named arm and sliding member being shaped to permit the lever and grooved member to be simultaneously gripped and forced together by the operator to control the sliding speed.

Signed at Los Angeles, California, this 10th day of August, 1922.

GEORGE W. HARDY.